United States Patent [19]

Hicks et al.

[11] Patent Number: 5,001,477
[45] Date of Patent: Mar. 19, 1991

[54] ENCODING VARIABLE LENGTH AND NULL DATA WHILE PRESERVING SORT SEQUENCE

[75] Inventors: Daniel R. Hicks, Byron; Gary R. Ricard, Rochester; John J. Vriezen, Zumbrota, all of Minn.

[73] Assignee: International Business Machines, N.Y.

[21] Appl. No.: 266,751

[22] Filed: Nov. 3, 1988

[51] Int. Cl.$^5$ .......................... H03M 7/00; H03M 7/40
[52] U.S. Cl. ........................................ 341/50; 341/67; 341/90
[58] Field of Search ............................... 341/50, 67, 90

[56] References Cited

U.S. PATENT DOCUMENTS 4,645,916  2/1987  Raisleger .......................... 341/90 X

OTHER PUBLICATIONS

IBM Technical Disclosure Bulletin, vol. 19, No. 9, Feb., 1977, "Multifield Encoding for Unrestricted Strings"; Blasgen, et al., pp. 3582-3583.

*Primary Examiner*—William M. Shoop, Jr.
*Assistant Examiner*—Sharon D. Logan

[57] ABSTRACT

A method of encoding data records comprised of null or variable length fields of data bytes such that the sortabilty of the resulting string of data is permitted via simple byte comparisons. The first field is examined to determine if it is a null field. A null field is a field containing no data. It should sort out before a field containing any data, even all zeros. If a null field is detected, it is represented in the encoded string of data by a null field indicator. If the field is not a null field, the bytes in the field are examined. Zero value bytes are encoded based on the number of consecutive zero value bytes while non-zero bytes remain unchanged. An end of field indicator designates the end of each field in the resulting string of encoded data.

25 Claims, 10 Drawing Sheets

ENCODING VARIABLE LENGTH AND NULL DATA WHILE PRESERVING SORT SEQUENCE

INCORPORATION BY REFERENCE

U.S. Pat. No. 4,774,657 assigned to the same assignee as the present application is hereby incorporated by reference.

BACKGROUND OF THE INVENTION

The invention relates to encoding data records to allow the sortability of the records.

Alphanumeric records of a data base may consist of variable length and null fields. Variable length fields cannot be simply catenated prior to collating because characters of long fields may interfere with those immediately following a short field, thereby destroying the correct sort sequence. For example, consider the names "Franz, Fred" and "Franzen, Fred". If simple concatenation is used the strings "FRANZFRED" and "FRANZENFRED" result but "FRANZENFRED" the longer of the last names, collates before "FRANZFRED". This is clearly incorrect. Also, at least one data base manipulation language, Structured Query Language (SQL), defines the concept of a null field. The null field should sort before any other field which has an actual value. It should even sort before a field consisting of all zeros. Since no sequence of bytes is less than all zeros, an encoding method must be provided to represent nulls. Furthermore, this encoding scheme should provide a method whereby the "Franz, Fred"—"Franzen, Fred" names collate correctly. An encoding method which provides a single string representing variable-length and null data fields within a data base record while preserving the correct sort sequence among multiple records is desirable. This encoding algorithm must also be reversible such that the original fields can be recovered from the encoded string.

One problem associated with current presort encoding techniques such as that shown in IBM Technical Disclosure Bulletin Vol. 19 No. 9, Feb. 1977, pages 3582-3583, Multifield Encoding For Unrestricted Strings, is that the resulting encoded strings can be very long. In this method, an integer value parameter, N, is chosen. The field to be encoded is padded with binary zeros so that its length is a multiple of N. To encode a two field string, each N bytes of the string are separated by a single 'trigger' character which is 'FF'X in this case. If the last N-byte substring of the field (i.e. the substring in which any padding occurred) is being processed then, instead of 'FF'x, a byte which indicates the number of non-padded characters in this substring is appended. This indicates the end of a field. As can be seen above and in the following example, the encoded string is filled with excess baggage. In an environment where data is paged in and out of main storage, a sorting operation can take a long time because the data is spread out over more pages which must be retrieved from a relatively slow storage device. To encode the two fields 'ABCDEF','XYZ' assuming N=4 and using '//' to indicate catenation ('//' does not appear in the actual data), we get "'C1C2C3C4'//'FF'//'C5C6'//'0000'//'02'// 'E6E7E8'//'00'//'03'" in the EBCDIC hexadecimal or base 16 notation of expressing alphanumeric data. This encoding technique does not handle null fields.

SUMMARY

A method of encoding data records comprised of multiple null or variable length fields of data bytes which allows the sortability of the resulting string of data via simple byte comparisons is presented. The first field is examined to determine if it is a null field. A null field is a field containing no data. It should sort out prior to a field containing any data, even all zeros. If a null field is detected, it is represented in the encoded string of data by a null field indicator. If the field is not a null field, the bytes in the field are examined. Zero value bytes are encoded based on the number of consecutive zero value bytes while non-zero bytes are placed directly into the encoded string. An end of field indicator designates the end of each field in the resulting string of encoded data.

In one preferred embodiment, non zero bytes are represented by their correct code. Null values are represented by '0000'X (hexadecimal). A single '00'X or a sequence of such bytes is replaced in the encoded representation of the field, by a '00'X byte followed by a byte representative of the number of '00'X bytes that were encountered. After the final byte of a field is processed, a '0001'X, the end of field indicator, is appended to the encoded representation of the field.

The inclusion of null values provides the benefit of maintaining correct sort order in the encoded string for those data bases which support null. Since the hexadecimal value for the null and end of field indicators are '0000'X and '0001'X respectively, it was necessary that zeros be represented by '00aa'X. "aa" is representative of the number of consecutive zero bytes. "aa" takes on a value between '02'X and 'FF'X. A further benefit results in that a string of zeros is compressed to two hex bytes.

A record preferably consists of one or more fields, such as "ABCDEF", "WXY" as a first record, and "ABCDEF", "MNOP" as a second record. When sorting, it is desirable that they are sorted in the same order as above, but if the fields of the record are simply catenated, they will sort in reverse order. The blank from record 2, field 1 will collate prior to the "W" from record 1, field 2. Using the technique of the present invention, "ABCDEF", "WXY" encodes as: "C1C2C3C4C5C60001E6E7E8400001." "ABCDEF", "MNOP" encodes as: "C1C2C3C4C5C6400001D4D5D6D70001." When sorting the two EBCDIC encodings, they stay in the desired order. It is also clear that less space is usually required to store the encoded string than encoded strings produced by the prior art method. This is a result of the prior method adding padding zeros, and using separators within a field or length of non-padded byte indications.

DETAILED DESCRIPTION

Figure 1:
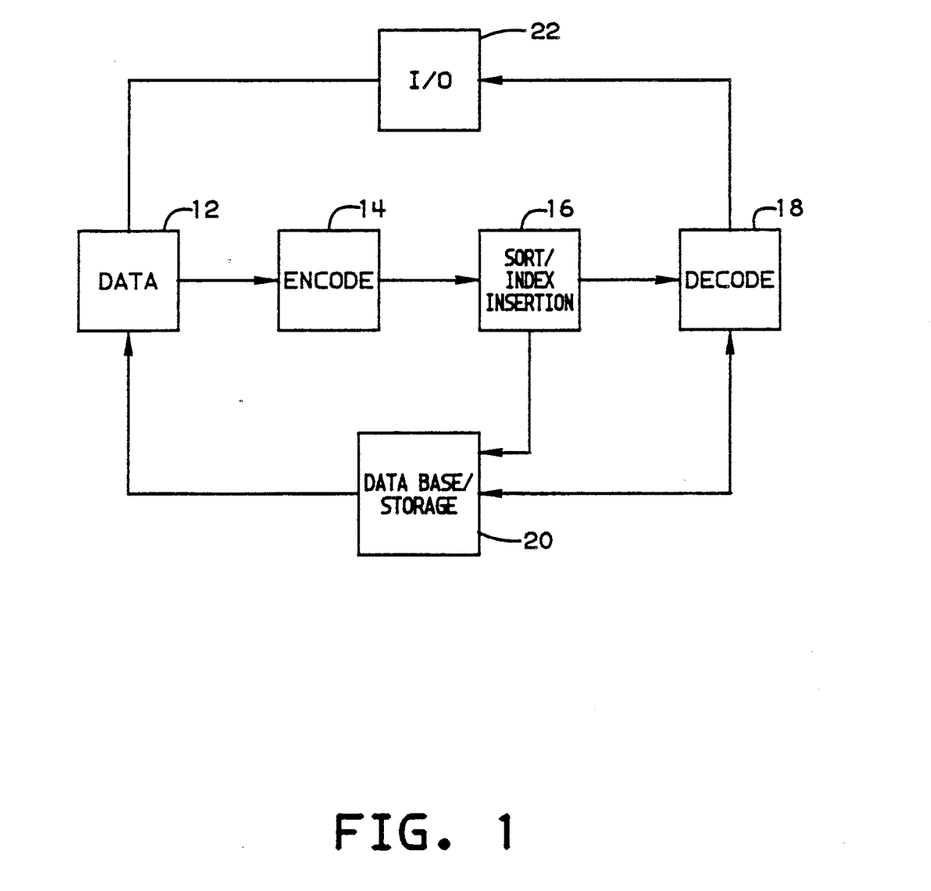
FIG. 1 is a block diagram of an implementation of the encoding invention.

A block diagram of the invention is shown in FIG. 1. Data at 12 is encoded at 14 prior to a sort operation 16. The data is usually data related to a data base 20, and may be a query of the data base, or data to add to the data base 20. Data base 20 consists of records which have multiple variable length fields. The data is encoded at 14 so that it correctly sorts at 16. The encoded data is then inserted into an index covering the data base 20, or is used to search the index in the case of the query. Indexes and their relation to data bases are described in further detail in U.S. Pat. No. 4,774,657 Index Key Range Estimator, which is hereby incorporated by reference. Basically, an index to a data base is a collection of pointers to records of the data base that are sorted based on the selected fields of each record. An example would be a data base of animals where one field is the name of the animal. An index could be an alphabetical listing based on the name field. Bird would come before cow. Other fields might include weight, species . . . .

The encoded data can be decoded at 18 for display on input/output devices at 22. I/O device 22 can be used to enter queries and data, and to display decoded data from decode 18. By maintaining indexes in encoded form, a search string for a query in encoded form is used to search the index. No special programming in the index manager is required to handle field boundaries since they are encoded in a manner that allows sortability. Hence, variable length multifield records can be handled just as previous records were handled.

A record is now described in more detail. Each record preferably consists of one or more variable length fields, such as "ABCDEF", "WXY" as a first record, and "ABCDEF", "MNOP" as a second record. When sorting, it is desirable that they are sorted in the same order as above, but if the fields of the record are simply catenated (strung together end to end) they will sort in reverse order. The blank from record 2, field 1 will collate prior to the "W" from record 1, field 2 because its EBCDIC representation is lower. Using the technique of the present invention prior to sorting, "ABCDEF", "WXY" "ABCDEF", "MNOP" encodes as: "C1C2C3C4C5C6400001D4D5D6D70001." When sorting the two EBCDIC encodings, they stay in the desired order.

In one preferred embodiment, non zero bytes are represented by their usual code. Null values are represented by '0000'X (hexadecimal). A single '00'X or a sequence of such bytes is replaced in the encoded representation of the field by a '00'X byte followed by a byte representative of the number of '00'X bytes that were encountered. After the final byte of a field is processed, a '0001'X, the end of field indicator, is appended to the encoded representation of the field.

The inclusion of null values provides the benefit of maintaining correct sort order in the encoded string for those data bases which support null. Since the hex values used for the null, and end of field indicators are '0000'X and '0001'X respectively, it was desirable that zeros be represented '00aa'X. "aa" is representative of the number of consecutive zero bytes, and takes on a value between '02'X and 'FF'X. A further benefit results in that a string of zeros is compressed to two bytes for every 127 bytes of zero.

Figure 2A:
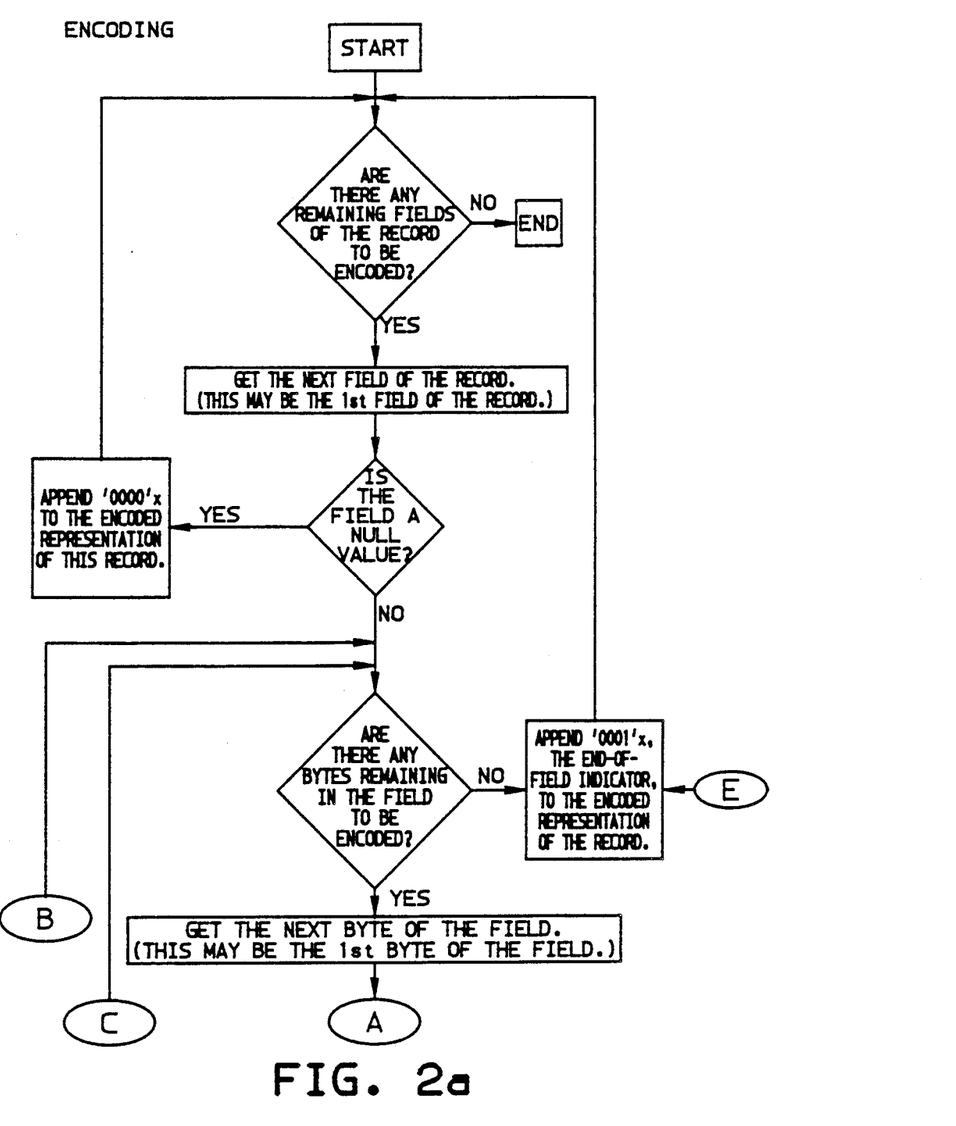
FIG. 2a-2c coupled as indicated by circled letters is a flow diagram of the encoding invention of FIG. 1.
Figure 2B:
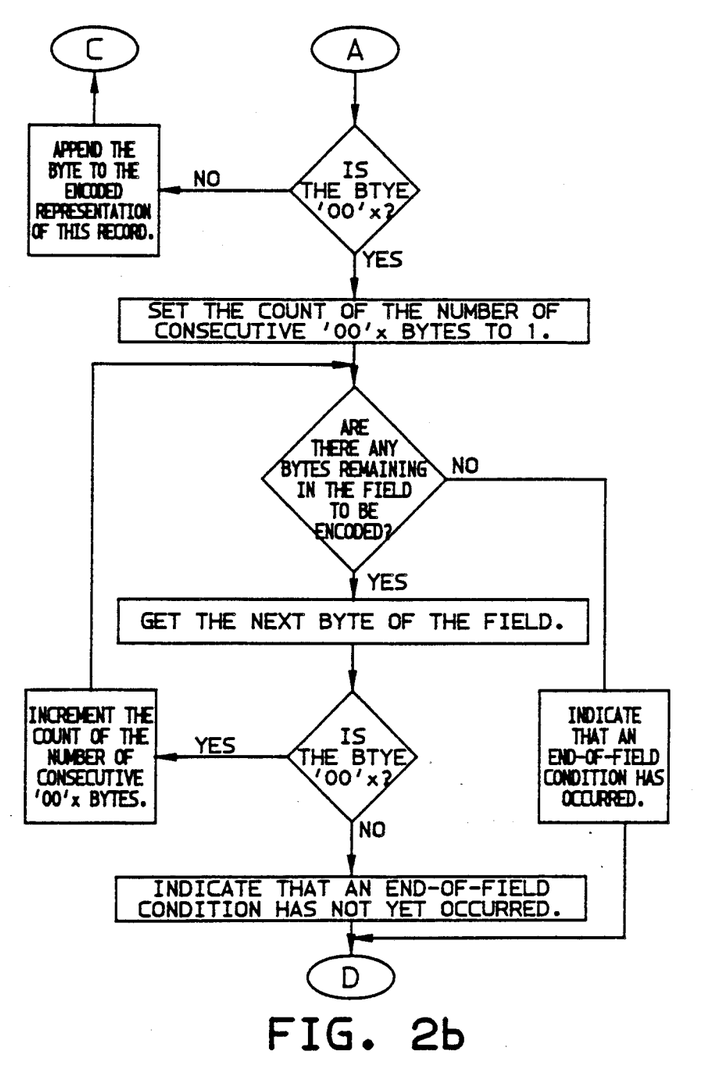
Figure 2C:
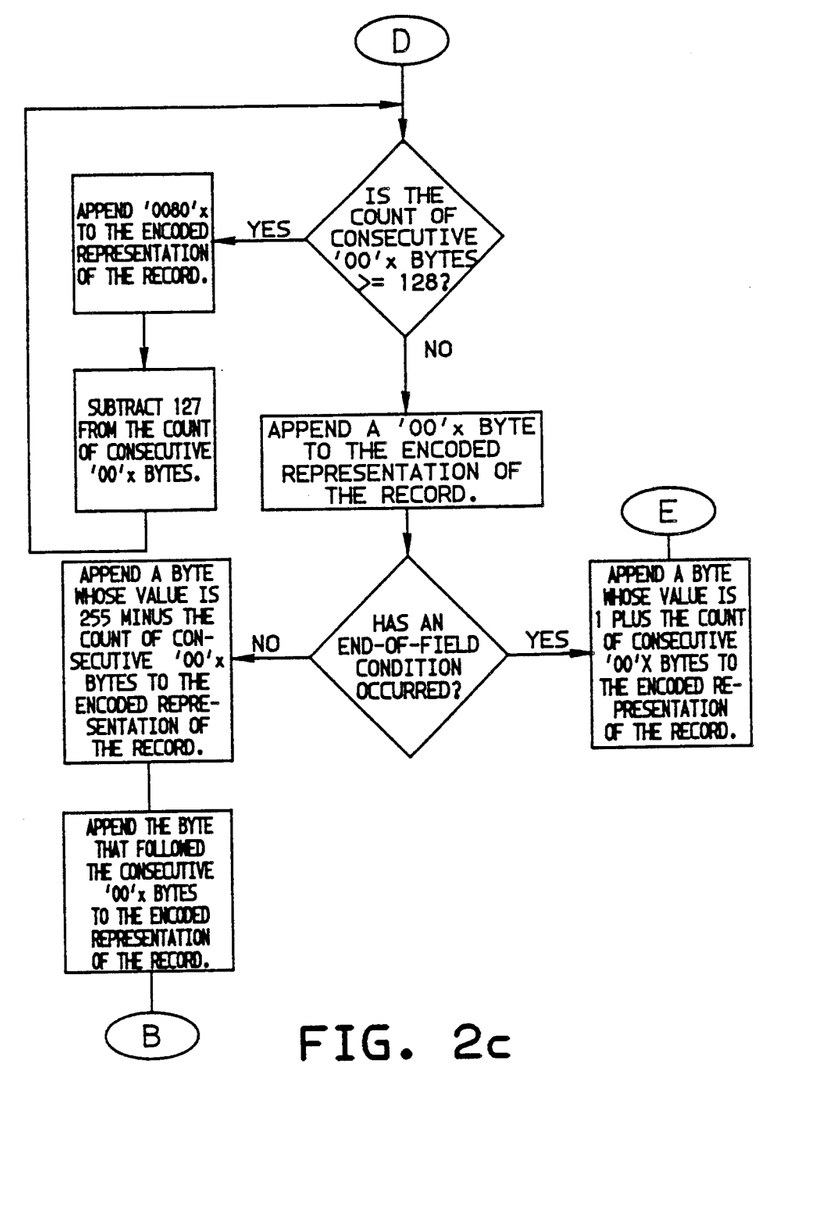

The encoded record is the catenation of all the encoded fields as demonstrated in FIG. 2. A single field is encoded as follows: If the field contains a null value then a '0000'X, the null field indicator, is the encoded representation of the field. This completes the encoding of a null field. If the field is non-null then each byte of the field is examined. If the current byte is not a '00'X then it is appended to the encoded representation of the field. Encoding then continues with the next byte of the field. If the current byte is a '00'X then the number of consecutive '00'X bytes beginning with the current byte is determined. If 128 or more consecutive '00'X bytes are present then a '0080'X sequence is appended to the encoded representation of the field for each group of 127 consecutive '00'X bytes until less than 128 '00'X bytes remain. The number of '00'X bytes that remain is used as the count of '00'X bytes in the following step.

If 127 or fewer consecutive '00'X bytes are present or if bytes remain from the previous step then the '00'X bytes are encoded as follows: If the series of consecutive '00'X bytes is not at the end of the field then a '00nn'X sequence is appended to the encoded representation of the field. The hex value of nn is given by 255 minus the number of consecutive '00'X bytes. Encoding then continues with the byte immediately following the consecutive '00'X bytes. If the series of consecutive '00'X bytes is at the end of the field then a '00mm'X sequence is appended to the encoded representation of the field. The hex value of mm is given by 1 plus the number of consecutive '00'X bytes. After the final byte of each field is processed a '0001'X, the end of field indicator, is appended to the encoded representation of the field. This completes the encoding of a non-null field.

The result of this encoding is a single string which collates correctly despite null values and variability of field length. The encoded data can then be easily sorted and placed in an index. If the encoded data is a query of an index, it is simply compared to the encoded values in the index. No special programming is required to handle the nulls or variable lengths of the fields. The data must be decoded following the sort or query, but this is simply reversing the encoding process such that the individual fields are recovered from the single encoded string.

Figure 3A:
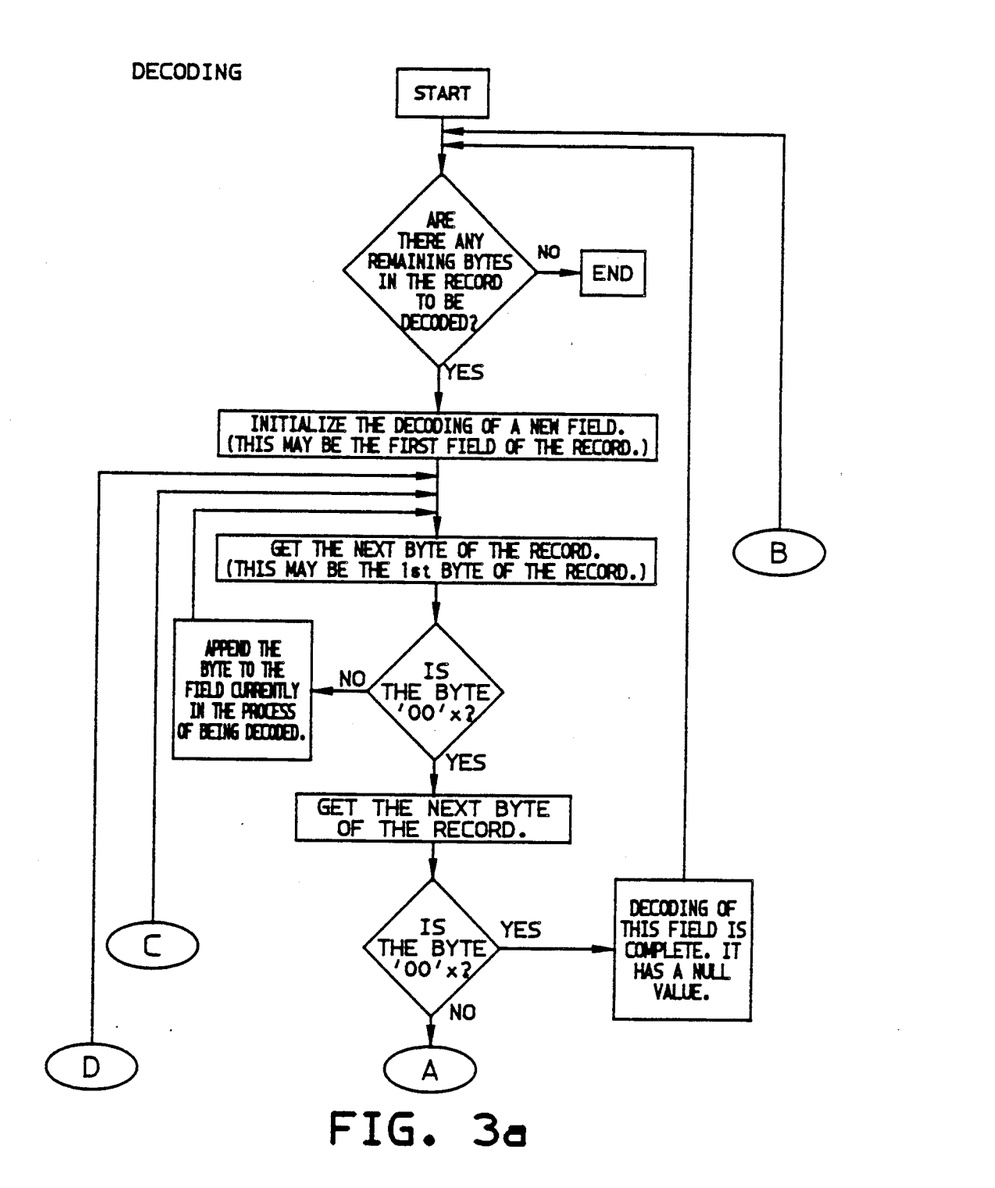
FIG. 3a-3b coupled as indicated by circled letters is a flow diagram of decoding an encoded record.
Figure 3B:
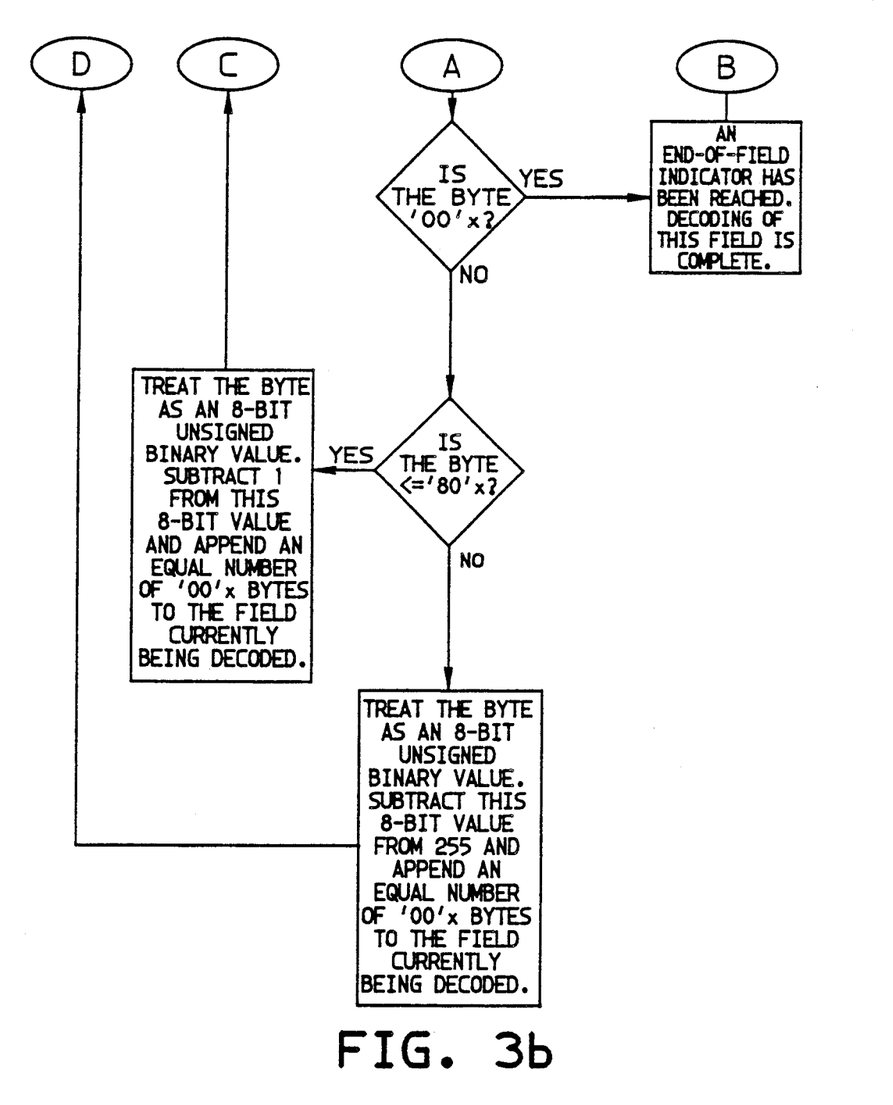

In decoding the encoded string as shown in further detail in FIG. 3, each byte of the record string is examined. If the current byte of the record is not '00'X then it is appended to the decoded representation of the current field. If the current byte is '00'X then the next byte of the record is examined. If this byte is '00'X then the current field contains a null value. Decoding of the current field is complete. Decoding then proceeds to the byte following this '00'X byte. This is the first byte of the next field. If the byte following the first '00'X byte is '01'X then an end-of-field indicator has been found and the current field is complete. Decoding then proceeds to the byte following this '01'X byte. This is the first byte of the next field. If the byte following the first '00'X byte is neither '00'X nor '01'X then it represents an encoded count of the number, yy, of '00'X bytes which must be appended to the decoded field. If yy is greater than '80'X then the number of '00'X bytes to append is 255-yy. Decoding then proceeds to the byte following yy. This is the next byte of the current field. If yy is less than or equal to '80'X then the number of '00'X bytes to append is yy-1. Decoding then proceeds to the byte following yy. This is the next byte of the current field.

Table 1 below sets forth some sample records and their encodings in accordance with the present invention. Fields within records are separated with commas.

TABLE 1

| Record | Encoding |
| --- | --- |
| Null | '0000'X |
| "" | '0001'X |
| '00'X | '00020001'X |
| '0000'X | '00030001'X |
| '000000'X | '00040001'X |
| '00000001'X | '00FC010001'X |
| '000001'X | '00FD010001'X |
| '0001'X | '00FE010001'X |
| '0002'X | '00FE020001'X |
| '01'X | '010001'X |
| "X,'0001'X,'00'X | '000100FE01000100020001'X |
| '00'X,'0001'X | '0002000100FE010001'X |
| "ABCEDF", "WXY" | 'C1C2C3C4C5C60001E6E7E8400001'X |
| "ABCEDF", "MNOP" | 'C1C2C3C4C5C6400001D5D6D70001'X |
| "ABCDEVGH","IJKL" | 'C1C2C3C4C5C6C7C80001C9D1D2D30001'X |

Figure 4A:
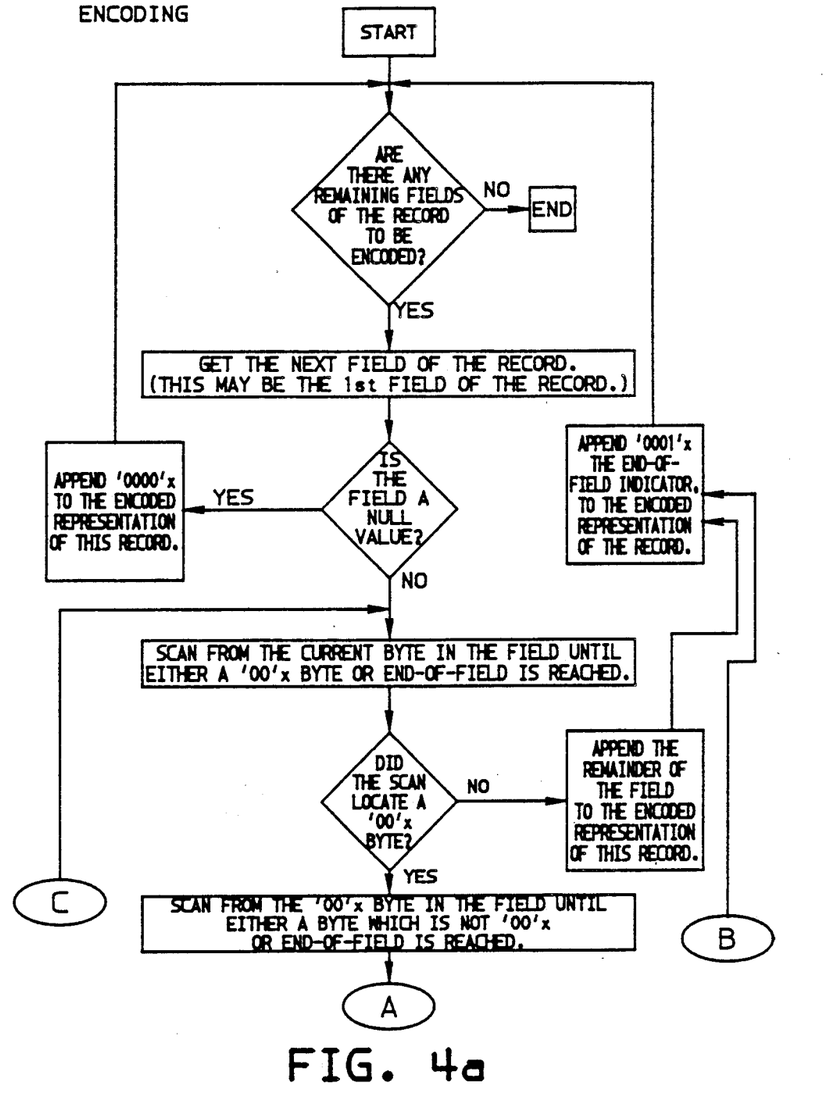
FIG. 4a-4b when coupled as indicated by circled letters is a flow diagram of encoding a record with a hardware assist.
Figure 4B:
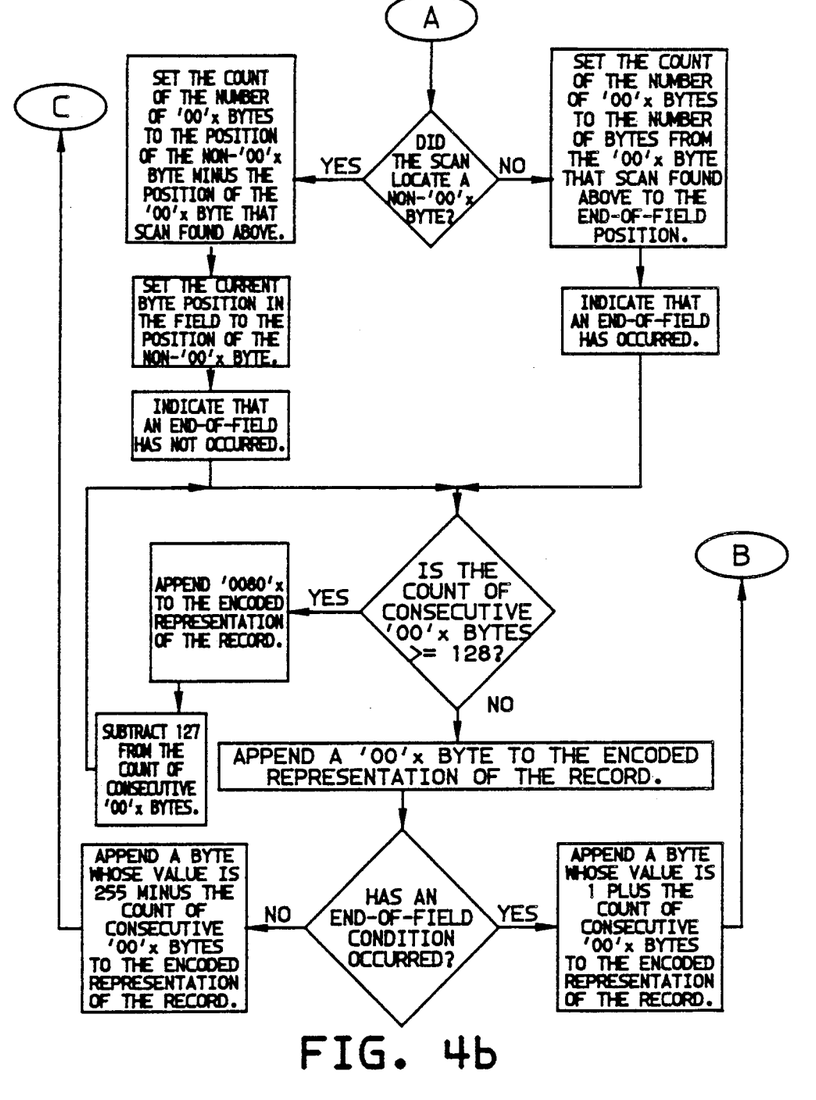
Figure 5A:
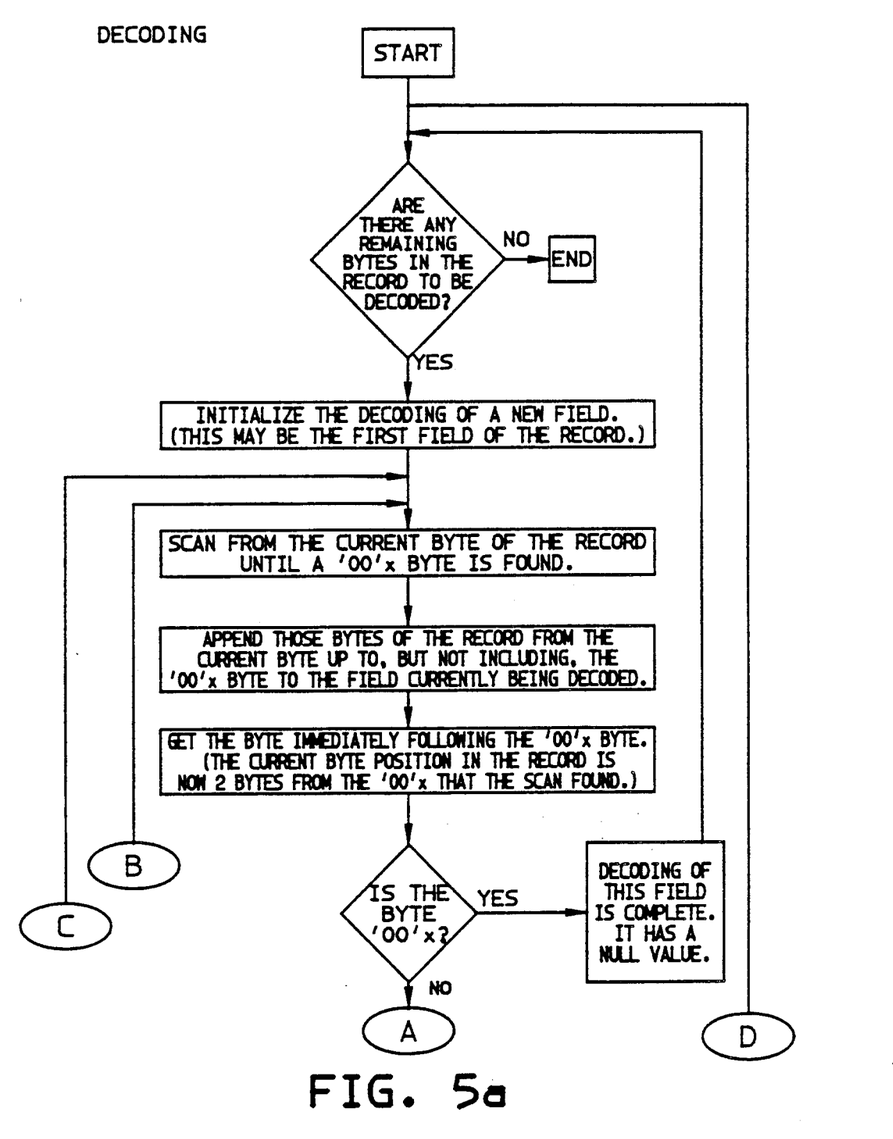
FIG. 5a-5b when coupled as indicated by circled letters is a flow diagram of decoding an encoded record with a hardware assist.
Figure 5B:
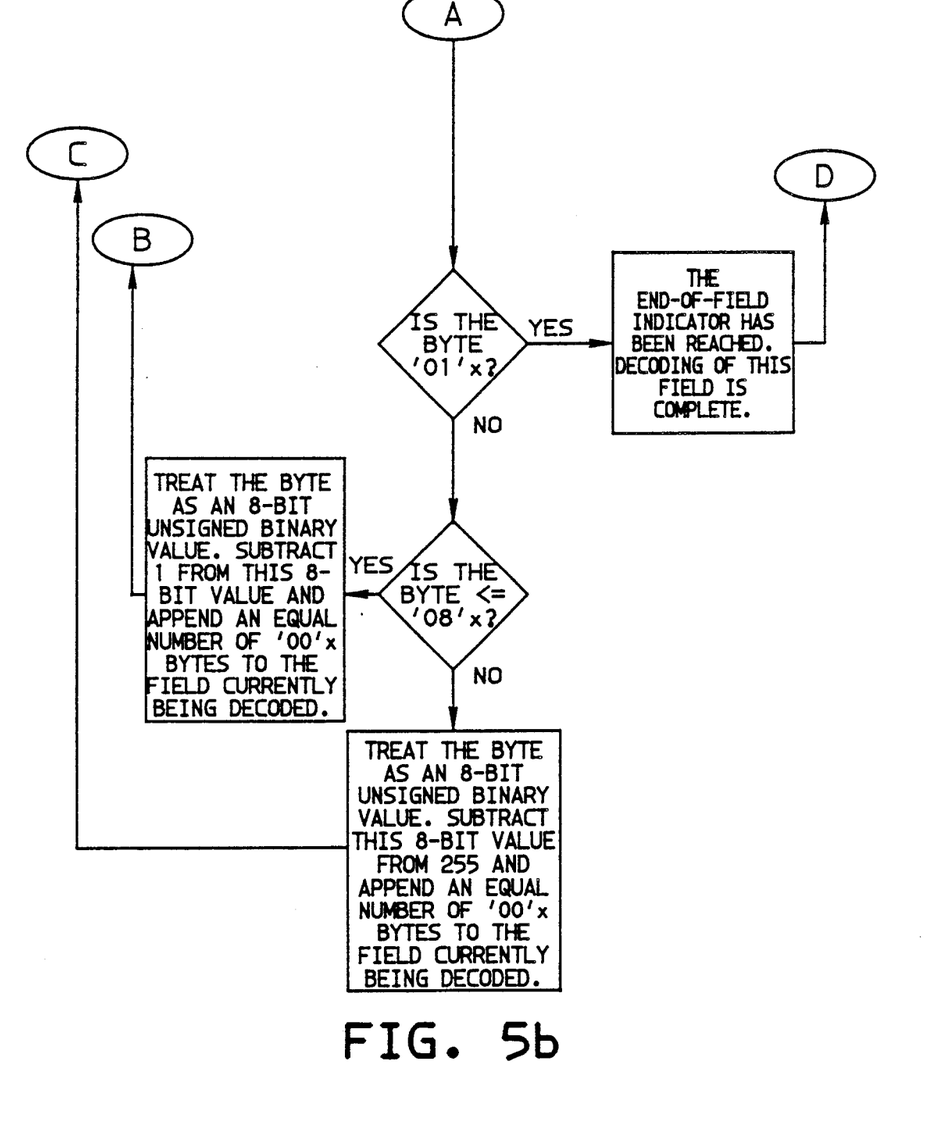

In a further embodiment as indicated by the flow diagram of FIGS. 4 and 5, a hardware assist is used in encoding and decoding records. The assist scans byte strings for specified bytes. It is used to process a string of '00'Xs much faster. Several program loops are avoided by use of the assist. Such assists are usually implemented in processors for quickly scanning for identified characters and are useful in searching for queried data.

While the invention has been described with respect to preferred embodiments, it will be recognized by those skilled in the art that further embodiments are within the scope of the invention. For example, a different data base may require that null fields sort in a different order. This may easily be accomplished by changing the hexidecimal code representations for null fields and repetitive byte strings. More or all of the encoding and decoding could be moved to hardware to increase the speed at which this takes place.

What is claimed is:

1. A method of encoding data records comprised of null fields and non-null fields of data bytes said data bytes comprised of zero bytes and other bytes, said method allowing sortability of the resulting string of data via simple byte comparisons, said method comprising the steps of:
   determining the presence of a null field or a non-null field:
   (a) encoding a null field indicator if said field is a null field;
   (b) encoding zero bytes based on the number of consecutive zero bytes in the non-null field;
   (c) directly encoding all the other bytes in the non-null field; and
   (d) appending an end of field indicator to the string of data provided said field is a non-null field.

2. The method of claim 1 wherein a null field is represented by the hexadecimal value '0000'.

3. The method of claim 1 wherein the hexadecimal value '0000' indicates the end of a null value field.

4. The method of claim 1 wherein a group of 127 consecutive bytes of '00'X in a field of data which contains a sequence of at least 128 consecutive '00'X bytes is represented by the hexadecimal value '0080'.

5. The method of claim 1 wherein a group of less than 128 consecutive bytes of '00'X in a field of data which does not include the last byte of data in the field is represented by the hexadecimal value of '00nn'X where nn is equal to 255 minus the number of such consecutive bytes.

6. The method of claim 1 wherein a group of less than 128 consecutive bytes of '00'X in a field of data which does include the last byte of data in the field is represented by the hexadecimal value of '00mm'X where mm is equal to one plus the number of such consecutive bytes.

7. The method of claim 1 wherein the hexadecimal value '0001' is used to indicate the end of a non-null field.

8. A mechanism for encoding data records comprised of null fields and non-null fields of data bytes, said data bytes comprised of zero bytes and other bytes, said mechanism allowing sortability of the resulting string of data via simple byte comparisons, said mechanism comprising:
   means for determining the presence of a null field or a non-null field;
   means for encoding a null field indicator if said field is a null field;
   means for encoding zero bytes based on the number of consecutive zero bytes in the non-null field;
   means for directly encoding all the other bytes in the non-null field; and
   means for appending an end of field indicator to the string of data provided said field is a non-null field.

9. The mechanism of claim 8 wherein the means for encoding a null field indicator encodes the hexadecimal value '000' to represent a null field.

10. The mechanism of claim 8 wherein the hexadecimal value '0000' also indicates the end of a null field.

11. The mechanism of claim 8 wherein the means for encoding zero bytes encodes the hexadecimal value '0080' to represent a group of 127 bytes of '00'X in a field of data which does not include the last byte of data in the field.

12. The mechanism of claim 8 wherein the means for encoding zero bytes encodes the hexadecimal value '00nn' to represent a group of less than 128 consecutive bytes of '00'X in a field of data which does not include the last byte of data in the field, where nn is equal to 255 minus the number of such consecutive bytes.

13. The mechanism of claim 8 wherein the means for encoding zero bytes encodes the hexadecimal value '00mm' to represent a group of less than 128 consecutive bytes of '00'X in a field of data which does include the last byte of data in the field, where mm is equal to one plus the number of such consecutive bytes.

14. The mechanism of claim 8 wherein the means for appending an end of field indicator appends the hexadecimal value '0001' to indicate the end of a non-null field.

15. The mechanism of claim 8 wherein the fields of data comprise a variable number of characters.

16. A mechanism for decoding sorting strings comprised of representations of null fields, fields of variable length data bytes, and end of field indicators, said mechanism comprising:
- means for identifying representations in a sorting string;
- means for generating a null field if a representation in the sorting string represents a null field;
- means for generating zero bytes based on the number of consecutive zero bytes represented in the sorting string;
- means for directly decoding representations in the sorting string which correspond to non-zero alphanumeric characters; and
- means for starting a new field when a representation in the sorting string is identified as an end of field indicator.

17. The decoding mechanism of claim 16 wherein the means for generating a null field generates a null field in response to the sorting string containing the hexadecimal value '0000'.

18. The decoding mechanism of claim 16 wherein the means for generating zero bytes generates 127 bytes of '00'X in response to the sorting string containing the hexadecimal value '0080'.

19. The decoding mechanism of claim 16 wherein the means for generating zero bytes generates 255-nn consecutive '00'X bytes in response to the sorting string containing the hexadecimal value '00nn' where nn is an integer from 129 to 254.

20. The decoding mechanism of claim 16 wherein the means for generating zero bytes generates mm-1 consecutive '00'X bytes in response to the sorting string containing the hexadecimal value '00mm', where mm is an integer from 2 to 128.

21. The decoding mechanism of claim 16 wherein the means for starting a new field starts a new field when encountering at least one of the hexadecimal values '0001' and '0000'.

22. A mechanism for encoding data records comprised of multiple variable length fields of characters which allows sortability of the resulting string of data via simple byte comparisons, said mechanism comprising:
- means for examining the characters within fields;
- means for detecting the end of each field;
- means for encoding all the characters in each field to produce a continuous string of the encoded characters for each field; and
- means for inserting an end of field indicator between each field in the encoded string of data such that no extra characters are encoded within an encoded field.

23. A mechanism for encoding data records related to a data base, said records comprised of nulls and fields of variable length data bytes which allows sortability of a resulting string of data via simple byte comparisons, said mechanism comprising:
- means for examining a field to determine if it is a null field;
- means for encoding a null field indicator if said field is a null field;
- means for examining the bytes of the field if it is not a null field;
- means for encoding zero bytes based on the number of consecutive zero bytes in the non-null field;
- means for directly encoding all the other bytes in the non-null field;
- means for appending an end of field indicator to the string of data provided said field is a non-null field;
- means for providing an encoded data record to an index covering the data base;
- means for providing a search string for encoding in the same manner as the data base records;
- means for searching the index with the encoded search string; and
- means for decoding data base records identified by the means for searching the index.

24. A method of encoding data records comprised of null fields and non-null fields of data bytes, said data bytes in the non-null fields comprised of strings of repeating bytes and strings of non-repeating bytes, said method allowing sortability of the resulting string of data via simple byte comparisons, said method comprising the steps of:
- (a) determining the presence of a null field or a non-null field;
- (b) encoding a null field indicator if said field is a null field;
- (c) encoding strings of repeating bytes based upon the number of consecutive repeating bytes in the string of repeating bytes in the non-null field;
- (d) directly encoding all the strings of non-repeating bytes in the non-null field; and
- (e) appending an end of field indicator to the string of data provided said field is a non-null field.

25. A mechanism for encoding data records comprised of null fields and non-null fields of data bytes, said data bytes in the non-null fields comprised of strings of repeating bytes and strings of non-repeating bytes, said mechanism allowing sortability of the resulting string of data via simple byte comparisons, said mechanism comprising:
- (a) means for determining the presence of a null field or a non-null field;
- (b) means for encoding a null field indicator if said field is a null field;
- (c) means for encoding strings of repeating bytes based upon the number of consecutive repeating bytes in the string of repeating bytes in the non-null field;
- (d) means for directly encoding all the strings of non-repeating bytes in the non-null field; and
- (e) means for appending an end of field indicator to the string of data provided said field is a non-null field.

* * * * *